United States Patent
Senda et al.

(10) Patent No.: US 7,390,424 B2
(45) Date of Patent: Jun. 24, 2008

(54) FERRITE MAGNETIC POWDER AND METHOD FOR PRODUCTION THEREOF

(75) Inventors: Masayasu Senda, Okayama (JP); Shinichi Suenaga, Okayama (JP); Hideki Katayama, Tsuyama (JP)

(73) Assignees: Dowa Electronics Materials Co., Ltd., Tokyo (JP); Nippon Bengara Kogyo Co., Ltd., Okayama (JP)

( * ) Notice: Subject to any disclaimer, the term of this patent is extended or adjusted under 35 U.S.C. 154(b) by 347 days.

(21) Appl. No.: 10/540,580

(22) PCT Filed: Feb. 13, 2004

(86) PCT No.: PCT/JP2004/001578

§ 371 (c)(1),
(2), (4) Date: Jun. 24, 2005

(87) PCT Pub. No.: WO2004/072995

PCT Pub. Date: Aug. 26, 2004

(65) Prior Publication Data

US 2006/0163525 A1    Jul. 27, 2006

(30) Foreign Application Priority Data

Feb. 14, 2003  (JP) .............................. 2003-037158

(51) Int. Cl.
*H01F 1/117* (2006.01)

(52) U.S. Cl. .................................... 252/62.54; 524/435
(58) Field of Classification Search ............. 252/62.63, 252/62.64, 62.54
See application file for complete search history.

(56) References Cited

FOREIGN PATENT DOCUMENTS

| JP | 57-82195 | | 5/1982 |
|---|---|---|---|
| JP | 4-93002 | | 3/1992 |
| JP | 04-93002 | * | 3/1992 |
| JP | 04-182318 | * | 6/1992 |
| JP | 5-70142 | | 3/1993 |
| JP | 2001-160506 | | 6/2001 |
| JP | 3294507 | | 4/2002 |

* cited by examiner

*Primary Examiner*—C. Melissa Koslow
(74) *Attorney, Agent, or Firm*—Clark & Brody

(57) ABSTRACT

A ferrite magnetic powder for bonded magnets bonded using a rubber-base resin as binder, which powder is a ferrite magnetic powder containing an alkaline earth metal and having a chlorine content of 0.05 wt % or less and a powder pH of less than 6. The magnetic powder is produced by pulverizing a calcinated product of ferrite composition containing an alkali earth metal, annealing the pulverized ferrite composition to relieve crystal strain, dispersing the annealed powder in water and adding to it a mineral acid, adding a dispersant thereto, and subjecting the dispersion to solid-liquid separation followed by vacuum drying to obtain a ferrite magnetic powder having a chlorine content of 0.05 wt % or less and a powder pH of less than 6.

2 Claims, 1 Drawing Sheet

FERRITE MAGNETIC POWDER AND METHOD FOR PRODUCTION THEREOF

TECHNICAL FIELD

This invention relates to a ferrite magnetic powder for bonded magnets that are bonded using a rubber-base resin binder and a method of producing the powder.

BACKGROUND ART

The magnetic characteristics of rubber-base bonded magnets that utilize rubber-base resin as binder are strongly affected by not only the characteristics of the magnetic powder used but also the filling rate of the magnetic powder in the rubber-base binder. Although the filling rate of magnetic powder in the rubber-base binder is affected by various factors, including the particle diameter and particle size distribution of the magnetic powder, the shape and surface configuration of the particles and the type of rubber-base binder, what is basically essential is for the magnetic powder to have high compatibility with the rubber-base binder without altering its inherent properties. In this specification, such property of a magnetic powder not degrading the intrinsic properties of a rubber-base binder is referred to as "magnetic powder non-reactivity" and the compatibility thereof with the rubber-base binder is referred to as "magnetic powder affinity."

When the magnetic powder non-reactivity and affinity are poor, viscosity becomes high and fluidity low at the time of kneading with the rubber-base binder or at the time of forming a compound. As a result, the magnetic particles are subjected to mechanical stress. The strain that arises in the magnetic particles owing to the application of mechanical stress degrades the coercive force of the magnetic powder.

The non-reactivity and affinity of a ferrite magnetic powder can be assessed by, for example, measuring the viscosity and/or shear stress of the compound. The non-reactivity and affinity (compatibility) with respect to the resin can be considered to be better in proportion as the viscosity and/or shear stress is smaller.

JP 2001-160506 A('506) teaches that a ferrite magnetic powder having a carbon content of 0.010-0.040 wt % and a pH of between 6 and less than 9 can be obtained by pulverizing a calcinated product composed of ferrite, annealing the result to obtain a ferrite magnetic powder having a pH of not less than 9, suspending the powder in water and blowing carbon dioxide gas into the suspension. The product is said to be excellent in non-reactivity and affinity with respect to resin-base binder. Reference '506 further teaches that in neutralization by adding a mineral acid instead of blowing in carbon dioxide gas, coherence occurring in the dried product makes necessary a considerably strong crushing process and, in such case, total prevention of occurrence of internal stress is difficult.

Japanese Patent No. 3294507 teaches that a ferrite magnetic powder having a carbon content of 0.015-0.080 wt % and a pH of between 7 and less than 10 can be obtained by bringing annealed ferrite magnetic powder into contact with a $CO_2$ source under stirring. The product is said to be excellent in non-reactivity and affinity with respect to resin-base binder.

PROBLEMS TO BE OVERCOME BY THE INVENTION

One feature of the rubber-base bonded magnet is that its toughness enables it to be mounted on equipment with a high degree of freedom. For example, a sheet-like rubber-base bonded magnet can be mounted at a curved portion in conformity with its curvature. This elasticity (toughness) of a bonded magnet may be degraded owing to properties of the magnetic powder. No reports have been published regarding causes on the side of the magnetic powder for such molded component degradability experienced by rubber-base bonded magnets.

In the case of rubber-base bonded magnets, when the molded component obtained by shaping into a prescribed configuration experiences toughness deterioration or change in shape, degradation of magnetic properties generally arises. In the case where, for instance, advantage is taken of the properties of a rubber-base bonded magnet to mount a sheet-like molded component as bent along a curved surface, the performance of the bonded magnet itself may be degraded if cracking should occur. No measures for extending service life after bonded magnet molding have so far been implemented from the side of the magnetic powder.

The present invention therefore resides in elucidating the cause on the side of the magnetic powder that produces degradation of magnetic properties after bonded magnet molding and to provide a ferrite magnetic powder for rubber-base bonded magnets that has been removed of the cause.

DISCLOSURE OF THE INVENTION

It was found that this object can be achieved by a ferrite magnetic powder containing an alkaline earth metal, which ferrite magnetic powder has a chlorine content of 0.05 wt % or less and a powder pH of less than 6. Such a magnetic powder can be obtained by pulverizing a calcinated product of ferrite composition containing an alkaline earth metal, annealing the pulverized ferrite composition to relieve crystal strain, dispersing the annealed powder in water and adding a mineral acid thereto, and adding a dispersant thereto, and subjecting the dispersion to solid-liquid separation followed by vacuum drying. It was found that the coherence preventing effect was higher during vacuum drying when a dispersant was added than when a dispersant was not added.

PREFERRED EMBODIMENT OF THE INVENTION

Figure 1:
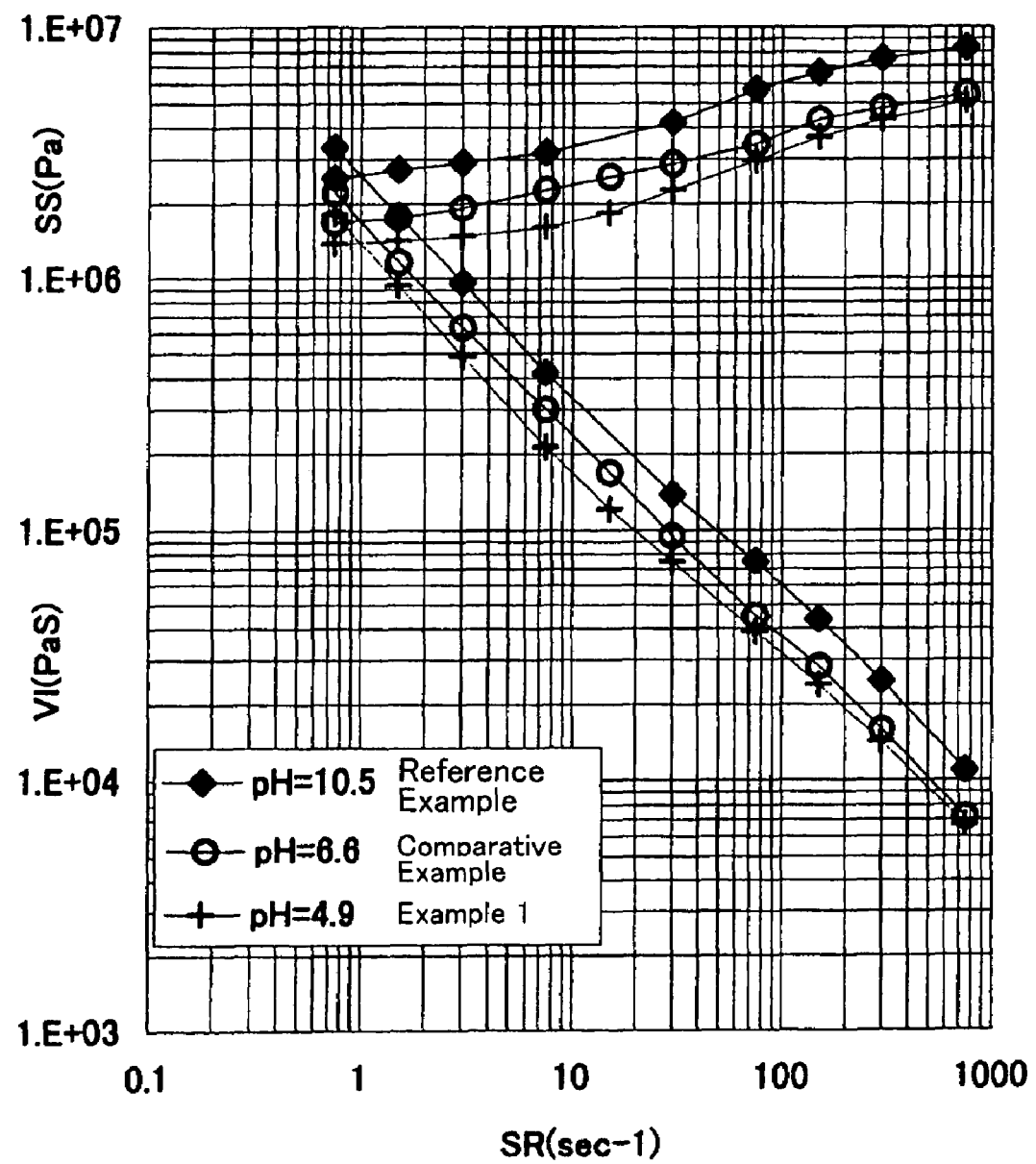
FIG. 1 is diagram wherein change in viscosity and shear stress with shear rate in the case of a compound obtained by mixing a ferrite magnetic powder according to the present invention and a rubber-base binder is compared with corresponding changes in the case of a Reference Example and a Comparative Example.

Ferrite magnetic powders vary considerably in composition and particle shape. The production process thereof by the dry method generally includes the steps of mixing starting materials palletizing →calcinating → crushing → washing and dewatering →drying → crushing → annealing product. The final "annealing" step is for relieving the crystal strain that arises during pulverizing after calcinating (and again during crushing following drying). The crystal strain arising during crushing and/or pulverizing needs to be relieved because it degrades the magnetic properties of the product, particularly its coercive force. After passing through this annealing step, the ferrite magnetic powder has a pH of 10-12, i.e., exhibits strong alkalinity. This rise in pH value is particularly pronounced in the case of a ferrite magnetic powder containing an alkaline earth metal.

When the ferrite magnetic powder exhibits such strong alkalinity, it degenerates the rubber-base binder and has a marked adverse effect on the viscosity and fluidity of the compound. In addition, residual impurity components and the like originating in additives and the starting materials are detected in the ferrite magnetic powder subjected to the annealing step. These residual components may become causes that work to degrade the rubber-base bonded magnet after kneading/molding. Among these components, chlorine was found to have an especially bad effect.

In this invention, the annealed ferrite magnetic powder is first suspended in water, preferably stirred thoroughly, and added with a mineral acid. This treatment lowers the chlorine entrained by the magnetic powder to a substantially harmless level. Moreover, it was found that quality degradation of the molded rubber-base bonded magnet component was prevented owing to lowering of the powder pH to below 6. The mineral acid used is preferably sulfuric acid.

Although treatment of lowering of the pH of the annealed powder suspension using a mineral acid tends to promote coherence during the drying after solid-liquid separation, it was found that coherence during drying can be avoided by carrying out an appropriate coherence preventing treatment. Generally used treatments for preventing coherence that might be considered include addition of an inorganic substance having little adsorbed water, addition of a fatty acid amide, fluorinated fatty acid or other such anti-sticking agent, and surface treatment with a silica type surface treatment agent or surfactant. However, the coherence preventing treatment according to the present invention is to prevent occurrence of coherence by adding a dispersant (surfactant) before the drying step and conducting the drying step under reduced pressure after solid-liquid separation.

By this, the chlorine content of the dried product obtained after subjecting the annealed ferrite magnetic powder to wet treatment in water becomes 0.05 wt % or less, preferably 0.02 wt % or less, and the powder pH becomes less than 6. The result is excellent in non-reactivity and affinity with respect to rubber-base binder and enables enhancement of the molded component bending strength. As a result, the characteristics of the rubber-base bonded magnet can be maintained over the long term.

The pH value of the ferrite magnetic powder referred to here is that measured in conformity with the measurement method of JIS K 5101. Although the ferrite magnetic powder to which the present invention can be applied is not particularly limited as regards composition, application to a ferrite magnetic powder containing an alkaline earth metal is particularly beneficial. The binder for bonding the ferrite magnetic powder is also not particularly limited insofar as it is a rubber-base binder. It is, for example, possible to utilize a vulcanizable rubber such as NBR (acrylonitrile butadiene copolymer rubber) or EPDM (ethylene propylene diene monomer rubber), or a thermoplastic resin having rubber elasticity such as CPE (chlorinated polyethylene), plasticized PVC (plasticized poly vinyl chloride), or EVA (ethylene vinyl acetate copolymer). It is also possible to use chlorosulfonated polyethylene, silicone rubber and the like.

EXAMPLE

Example 1

Iron oxide and strontium carbonate were weighed out and mixed at a mole ratio of 5.75, the result was pelletized using water and, after drying, calcinated in a furnace at 1290° C. for 4 hours. The calcinated product was coarsely crushed and then wet-pulverized using a wet mill to obtain a strontium ferrite magnetic powder of an average particle diameter of 1.4 µm. The magnetic powder was annealed in a furnace at 980° C. for 1 hour. The obtained annealed product contained 0.055 wt % of chlorine and had a pH measured by the method of JIS K5101 of 10.22. The powder, 12,000 g, was mixed with water to obtain a suspension with a pulp concentration of 25 wt %. Sulfuric acid was added to the suspension under stirring so as to make the sulfuric acid concentration of the suspension 0.10%, whereafter stirring was continued for 15 minutes. Water washing was conducted by decantation, Surfynol CT151 (product of Nissin Co., Ltd.) was added as dispersant in an amount to make the concentration 0.25% relative to the ferrite magnetic powder. Stirring was conducted for another 10 minutes. The result was dewatered and the cake obtained was dried under reduced pressure and then crushed using a high-speed agitation-type crusher to obtain a strontium magnetic powder of an average particle diameter of 1.4 µm. The obtained magnetic powder was chemically analyzed. No more than 0.01 wt % of chlorine was detected. The pH was measured and found to be 4.9.

The obtained magnetic powder, 136.1 g, and 13.5 g of NBR were charged into a LaboPlast Mill (Toyoseiki Co.), kneaded for 10 minutes at a temperature of 80° C., once discharged, and kneaded again under the same conditions. The obtained kneaded product was rolled into a sheet using six-inch rolls and the sheet was cut to obtain several samples measuring 3 mm in thickness, 2 mm in width and 50 mm in length (for affinity evaluation) and a sample measuring 3 mm in thickness, 200 mm in width and 50 mm in length (for molded component degradation evaluation).

Affinity was assessed by measuring shear rate (SR), viscosity and shear stress using a capillograph (Toyoseiki Co.). The results of the measurement are shown in FIG. 1. The horizontal axis in FIG. 1 is graduated for shear rate ($sect^{-1}$) and the vertical axis for viscosity (PaS) and shear stress (Pa), and shows change in viscosity and shear stress with change in shear rate. For comparison, FIG. 1 also shows a similar evaluation of affinity for a magnetic powder at the annealing stage (which, as mentioned earlier, had a chlorine content of 0.055 wt % and a pH of 10.22; this magnetic powder being referred to as a Reference Example).

From the results shown in FIG. 1, it can be seen that, in comparison with the Reference Example, the magnetic powder of Example 1 exhibited low viscosity and shear stress values in the kneaded rubber-compound product, as well as good affinity with the rubber-base binder.

Molded component degradability was assessed by maintaining the sheets at 100° C. for five days, cooling them to room temperature, and then subjecting them to a bending strength test in which each sheet was wrapped around a 22 mm diameter cylinder. Degree of cracking of the sheet surfaces was classified into three ranks. The sheet using the magnetic powder of this Example ranked A in degradability, while that using the annealing stage magnetic powder (Reference Example) ranked C.

A: No cracking observed whatsoever;

B: Cracks of under 3 mm length observed;

C: Cracks of 3 mm and greater length and 0.1 mm and greater width observed.

Comparative Example

Example 1 was repeated except that at the time of adding the sulfuric acid the sulfuric acid concentration was changed from 0.10% to 0.05%. The obtained magnetic powder was chemically analyzed. No more than 0.01 wt % of chlorine was detected and the powder pH was 6.6.

The powder of this Comparative Example was subjected to the affinity evaluation of Example 1. The results are shown in FIG. 1. The powder was also subjected to the molded component degradability test of Example 1. It ranked B.

As explained in the foregoing, the present invention provides a ferrite magnetic powder that is superior in non-reactivity and affinity with respect to a rubber-base binder. A rubber-base bonded magnet utilizing the magnetic powder is excellent in molded component toughness and does experience cracking or the like even in a state subjected to bending deformation. As such, the present invention provides an outstanding effect toward preventing loss of the deformability that is a feature of rubber-base bonded magnets.

The invention claimed is:

1. A bonded magnet obtained by bonding a ferrite magnetic powder containing an alkaline alkali earth metal and having a chlorine content of 0.05 wt % or less and a powder pH of less than 6 with a rubber-based binder selected from NBR (acrylonitrile butadiene copolymer rubber) or EPDM (ethylene propylene diene monomer rubber).

2. A bonded magnet obtained by bonding a ferrite magnetic powder containing an alkaline earth metal and having a chlorine content of 0.05 wt % or less and a powder pH of less than 6 with a rubber-based binder of a thermoplastic resin having rubber elasticity selected from CPE (chlorinated polyethylene), plasticized PVC (plasticized polyvinyl chloride) or EVA (ethylene vinyl acetate copolymer.

* * * * *